United States Patent Office 3,087,924
Patented Apr. 30, 1963

3,087,924
COPPER-CONTAINING MONOAZO DYESTUFFS
William Elliot Stephen, Colin George Tilley, and Cyril Eric Vellins, all of Manchester, England, assignors to Imperial Chemical Industries Limited, London, England, a corporation of Great Britain
No Drawing. Filed June 16, 1958, Ser. No. 741,996
Claims priority, application Great Britain July 5, 1957
2 Claims. (Cl. 260—146)

This invention relates to new copper-containing monoazo dyestuffs and more particularly it relates to new copper-containing monoazo dyestuffs obtained from cyanuric halides.

This is a continuation-in-part of U.S. application 549,177, filed November 25, 1955, now U.S. Patent 2,892,828.

According to the invention there are provided the copper-containing monoazo dyestuffs which correspond in their copper-free state to the formula:

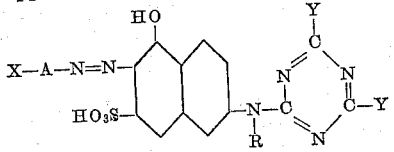

Formula 1 wherein

A stands for an aryl radical containing at least one sulphonic acid group,
X stands in ortho position to the azo group and represents a substituent capable of metal complex formation,
R stand for an alkyl group, and
Y stands for a halogen atom.

The aryl nucleus represented by A in the above formula may be for example, a benzene nucleus or a naphthalene nucleus, and it may be further substituted, for example, by halogen such as chlorine, by alkyl such as methyl, by alkoxy such as methoxy and ethoxy, by alkyl sulphonyl, by alkylcarbonyl such as acetyl, acylamino, nitro and sulphamyl.

X in the above formula may represent, for example a hydroxy, methoxy, carboxy or carboxymethoxy group.

The alkyl group represented by R is preferably one containing 4 or less carbon atoms.

The new copper-containing monoazo dyestuffs contain one atom of copper for each molecule of the copper-free compounds of Formula 1.

The new copper-containing monoazo dyestuffs may be obtained by reacting together at least one molecular proportion of a cyanuric halide with one molecular proportion of one of the copper-containing compounds which corresponds in their metal-free state to the formula:

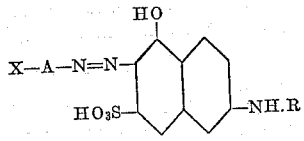

Formula 2 wherein X, A and R have the meanings given above.
This process forms a further feature of the invention.

The compounds of Formula 2 may be obtained by coupling one molecular proportion of the diazo compound of an aminoaryl compound which contains at least one sulphonic acid group and which also bears in ortho position to the amino group a substituent which is capable of metal complex formation, with one molecular proportion of a 2-alkylamino-5-naphthol-7-sulphonic acid.

The compounds so obtained are then treated with a copper-yielding agent in order to obtain the copper-containing compounds used in the process of the invention.

The coupling of the diazotised aminoaryl compound with the 2-alkylamino-5-naphthol-7-sulphonic acid is preferably carried out in alkaline medium. Suitable 2-alkylamino-5-naphthol-7-sulphonic acids are those containing, for example a methylamino, ethylamino, propylamino or butylamino radical attached to the 2 position of the naphthalene nucleus.

The preferred aminoaryl compounds for use as diazo components are those of the benzene series, especially valuable dyestuffs being obtained when the diazo component used to obtain the compound of Formula 2 is a 2-aminophenol containing at least one and preferably two sulphonic acid groupings.

Suitable aminoaryl compounds include, for example, 2-aminophenol-4-sulphonic acid, 2-aminophenol-4:6-di-sulphonic acid, 4-nitro-2-aminophenol-6-sulphonic acid, 6-nitro-2-6-chloro-2-aminophenol - 4 - sulphonic acid, 2-aminoanisole-4-sulphonic acid, 5-nitro-2-aminoanisole-4-sulphonic acid, 1-amino-2-naphthol-4-sulphonic acid and 1-amino-6-nitro-2-naphthol-4-sulphonic acid.

To convert the copper-free compounds of Formula 2 to their complex copper compounds, the copper-free compounds are treated with a copper-yielding agent such as copper sulphate and cuprammonium sulphate, the latter being preferably used for coppering when the metallisable group is an alkoxy group, by methods well-known in themselves, for example by heating the copper-free compound with an aqueous solution of the copper-yielding agent.

The process of the invention is preferably carried out at below 5° C. The preferred reaction medium is water, although it may also contain water-soluble organic solvents such as acetone or dioxan. It is desirable to add an acid-binding agent, preferably sodium carbonate or sodium bicarbonate to keep, so far as be possible, the medium at a pH between 6 and 7 during the reaction period.

The new dyestuffs may be isolated by customary techniques for the isolation of water-soluble dyestuffs, usually by precipitating the dyestuff in the form of its sodium salt by adding sodium chloride to the reaction medium and filtering off and drying the resultant precipitate.

In order to lessen the removal, by hydrolysis, of the halogen atoms attached to the triazine nuclei of the new dyestuffs it is preferred to adjust the pH of the reaction medium to about 6.5 at the end of the reaction period and before isolating the new dyestuff. It has also been found advantageous to add certain buffers which dissolve in water to give an aqueous solution of pH between 5 and 8 at this point in the manufacturing process.

Suitable buffers are mixtures of water-soluble acid salts of phosphoric acid, or of dialkylaminoaryl sulphonic acids, in which the alkyl groups contain at least two carbon atoms, and their alkali metal salts which give an aqueous solution of pH about 6.5. These buffers may also be added with advantage to the dried dyestuff powder since the stability of the dyestuff in the powder is greatly enhanced thereby.

The new dyestuffs of the invention, in the form of their alkali-metal salts, are readily soluble in water. They are especially useful for the colouration of cellulosic textile materials in conjunction with a treatment with an acid-binding agent, for example by the process described in Belgian specification No. 543,218, wherein the coloured textile material is after-treated with an acid-binding agent, or by related processes wherein an acid-binding agent is applied to the textile material before or during the treatment with the dyestuff.

When so applied the new copper-containing monoazo dyestuffs colour cellulosic fibres in reddish violet shades having very good fastness to washing and to light.

The invention is illustrated but not limited by the following examples in which parts and percentages are by weight:

Example 1

Diazotised 2-aminophenol-4-sulphonic acid is coupled with an alkaline solution of 2-methylamino-5-naphthol-7-sulphonic acid, and the aminoazo compound obtained is converted to the copper complex by boiling for a short time with an aqueous solution of copper sulphate containing a little acetic acid.

Sufficient of the sodium salt of the copper complex so obtained to contain 45.3 parts of the aminoazo compound is dissolved in water and added to a suspension of 18.4 parts of cyanuric chloride in ice-cold water. The mixture is stirred for 1 hour at from 0 to 5° C., sodium carbonate being added at intervals to neutralise the mixture to litmus.

Sodium chloride is then added at the rate of 100 parts for every 1000 parts of solution and the product which separates is filtered off and dried. The new copper containing monoazo dyestuff so obtained contains 1.88 organically bound chlorine atoms for each azo group present and consists substantially of the dichlorotriazinyl derivative of the copper-containing aminoazo compound used as starting material.

The dyestuff is mixed with 1/10 its weight of a 1:1.8 mixture of disodium hydrogen phosphate and potassium dihydrogen phosphate. The product so obtained colours cellulosic fibres in reddish violet shades when applied by the methods described above. Two suitable colouring recipes which may be used are as follows:

(1) 100 parts of cotton fabric are padded in a 2% aqueous solution of the dyestuff and squeezed until the weight of the fabric is 200 parts. The fabric is dried, padded in an aqueous solution containing 1% of caustic soda and 30% of sodium chloride, and again squeezed until its weight is 200 parts.

The fabric is then steamed for 1 minute at 100° C., then rinsed in water, boiled in a dilute soap solution for five minutes, rinsed again in water and dried. It is dyed a level reddish violet shade having very good fastness to washing and to light.

(2) A printing paste is made by mixing together 2 parts of the dyestuff, 5 parts of urea, 40 parts of a 5% aqueous solution of sodium alginate, 52 parts of water and 1 part of sodium bicarbonate.

The printing paste is applied to cotton fabric by roller and the treated fabric is dried and then steamed for 5 minutes. The fabric is then rinsed in water, boiled in a dilute soap solution for five minutes, rinsed again in water and dried. The fabric is locally coloured a reddish violet shade where the printing paste was applied. The shade is very fast to light and to washing, there being very little staining of the adjacent white portions of the fabric when the printed fabric is subjected to severe washing tests.

In the following table, there are set forth additional examples of the invention which are obtained in the manner described in Example 1 above but starting from the diazo and coupling components listed in the first and second columns of the table. The final column shows the shades of the new copper-containing monoazo dyestuffs obtained when they are used to colour cellulosic fabrics by the the recipes described in Example 1.

| Diazo Component | Coupling Component | Shade |
|---|---|---|
| (2) 2-aminophenol-4:6-disulphonic acid. | 2-methylamino-5-naphthol-7-sulphonic acid. | Reddish violet. |
| (3) 4-nitro-2-aminophenol-6-sulphonic acid. | 2-n-butylamino-5-naphthol-7-sulphonic acid. | Do. |
| (4) 6-chloro-2-amino-phenol-4-sulphonic acid. | 2-ethylamino-5-naphthol 7-sulphonic acid. | Do. |
| (5) 4-chlor-2-aminophenol-6-sulphonic acid. | 2-methylamino-5-naphthol-7-sulphonic acid. | Do. |
| (6) 1-amino-6-nitro-2-naphthol-4-sulphonic acid. | -----do----- | Bluish red. |
| (7) 4-sulpho-2-aminobenzoic acid. | -----do----- | Orange brown. |
| (8) 6-nitro-2-aminophenol-4-sulphonic acid. | -----do----- | Reddish violet. |
| (9) 5-sulpho-2-aminobenzoic acid. | -----do----- | Orange brown. |
| (10) 2-aminophenol-4:6-disulphonic acid. | 2-n-butylamino-5-naphthol-7-sulphonic acid. | Reddish violet. |
| (11) 2-aminophenol-4-sulphonic acid. | -----do----- | Do. |
| (12) 6-chloro-2-aminophenol-4-sulphonic acid. | -----do----- | Do. |

What we claim is:

1. The 1:1-copper complexes of the monoazo dyestuffs which correspond in their copper-free state to the formula:

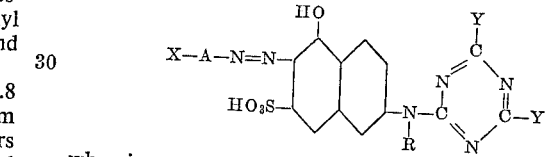

wherein

A is a member selected from the group consisting of divalent radicals of benzene and naphthalene containing at least one sulphonic acid group, X stands in ortho position to the azo group and represents a substituent selected from the group consisting of hydroxyl and carboxyl, R stands for a lower alkyl group, and Y stands for a chlorine atom.

2. The 1:1 copper complexes of the monoazo dyestuffs which correspond in their copper-free state to the formula:

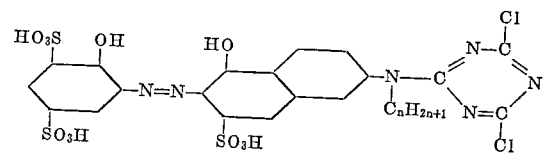

wherein $n$ stands for an integer of from 1 to 4.

References Cited in the file of this patent

UNITED STATES PATENTS

| 1,667,312 | Fritzsche et al. | Apr. 24, 1928 |
| 2,653,149 | Riat | Sept. 22, 1953 |
| 2,763,640 | Riat et al. | Sept. 18, 1956 |
| 2,892,828 | Stephen | June 30, 1959 |

FOREIGN PATENTS

| 545,035 | Italy | June 22, 1956 |
| 760,347 | Great Britain | Oct. 31, 1956 |
| 1,139,795 | France | Feb. 18, 1957 |